United States Patent [19]

Flynn

[11] Patent Number: 4,862,563
[45] Date of Patent: Sep. 5, 1989

[54] SECURING STRAP AND FASTENER

[75] Inventor: James P. Flynn, Janesville, Wis.

[73] Assignee: Jane Marie Flynn, St. Paul, Minn.

[21] Appl. No.: 72,333

[22] Filed: Jul. 13, 1987

[51] Int. Cl.4 ............................................. A44B 18/00
[52] U.S. Cl. .................................... 24/442; 24/31 V; 24/306
[58] Field of Search ................. 24/442, 444, 445, 447, 24/304, 306, 31 R, 31 V, DIG. 11; 248/205.2; 128/DIG. 15, 327; 2/DIG. 6

[56] References Cited

U.S. PATENT DOCUMENTS

| | | |
|---|---|---|
| 1,638,073 | 8/1927 | Van Heusen ........................ 24/442 |
| 3,086,529 | 4/1963 | Munz et al. ................. 128/DIG. 15 |
| 3,138,841 | 6/1964 | Naimer . |
| 3,320,649 | 5/1967 | Naimer . |
| 3,430,299 | 3/1969 | Copen . |
| 3,461,511 | 8/1969 | Perina ................................ 24/31 V |
| 3,472,198 | 10/1969 | Rinecker ............................. 24/442 |
| 3,503,101 | 3/1970 | Kolozsvary ......................... 24/306 |
| 3,530,687 | 9/1970 | Hamano . |
| 3,539,436 | 11/1970 | Hamano . |
| 3,542,041 | 11/1970 | Mercorella ......................... 24/442 |
| 3,543,977 | 12/1970 | Lockridge ................. 128/DIG. 15 |
| 3,640,273 | 2/1972 | Ray ..................................... 24/306 |
| 3,718,725 | 2/1973 | Hamano . |
| 3,770,359 | 11/1973 | Hamano . |
| 3,819,177 | 6/1974 | Spiro . |
| 3,827,107 | 8/1974 | Moore . |
| 3,947,927 | 4/1976 | Rosenthal . |
| 3,977,393 | 8/1976 | Kovacic .............................. 128/327 |
| 4,005,506 | 2/1977 | Moore . |
| 4,149,540 | 4/1979 | Hasslinger . |
| 4,213,548 | 7/1980 | Wood ............................. 2/DIG. 6 |

Primary Examiner—Victor N. Sakran
Attorney, Agent, or Firm—Lathrop & Clark

[57] ABSTRACT

The present invention is directed to a flexible securing strap having at one end a double-sided strip of VEL-CRO ® hook material. The other end is bifurcated into two sections, each of which have the VELCRO ® loop material on the internal surface, such that the VEL-CRO ® hook end will attach to the interior surfaces of each of the bifurcated end sections in a sandwhich fashion. The invention is also directed to the fastener itself.

8 Claims, 1 Drawing Sheet

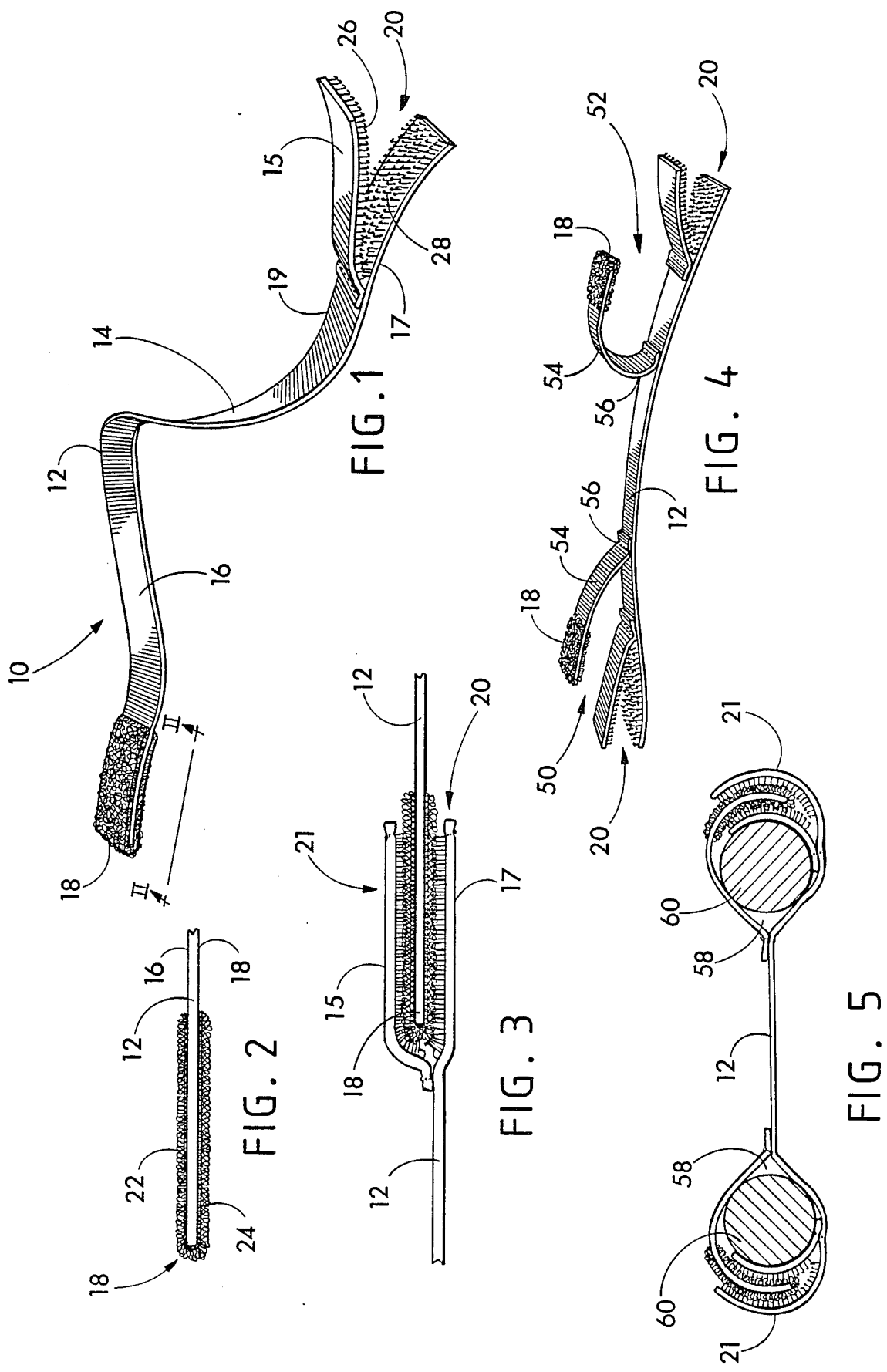

SECURING STRAP AND FASTENER

BACKGROUND OF THE INVENTION

1. Field of the Invention

The present invention is directed to a securing strap, and specifically to a flexible-type securing strap which is adapted to be placed in encircling relation about a device to be secured. The invention is also directed to a specialized fastener for the securing strap.

2. Description of the Prior Art

Flexible securing straps are well known to the art. They can be in many forms including a resilient strap having a buckle fastener arrangement or a bungi-type cord with metal hooks on each end. The straps have a wide variety of uses. Perhaps the most prevalent type of securing strap known today has a fastener marketed under the registered trademark VELCRO brand hook and loop fasteners by Velcro Corporation, 681 5th Avenue, New York, N.Y. This type of fastener has gained wide acceptance because of the properties of co-acting gripping surfaces in the form of mating hooks and loops, which permit their attachment by placing one surface defined by hooks into face-to-face relationship with another surface defined by the loops so that a large number of loops resists separation parallel to the interfacial plane of engagement but are readily separable by peeling forces applied substantially normal to this interfacial plane. The term "interfacial plane of engagement", as used herein, refers to the area of attachment of the two reciprocating gripping surfaces. These fastening devices are generally formed of a sheet of synthetic woven or knitted fabric having raised threads of synthetic material, such as nylon, which are napped or unnapped to provide a pile surface defined by a plurality of loops, and which may be thermally treated to become semi-rigid. Certain of the loops may then be cut along one side near their outer extremity to form hooks.

In the prior art applications of VELCRO ® brand fasteners, the structure has nearly always been adapted such that each fastener includes one hook surface and one loop surface which is secured by touch action. For example, reference is made to U.S. Pat. No. 3,086,529 to Munz et al which discloses an elastic strap having at one end the VELCRO ® pile material and at the other end the VELCRO ® loop material. Additionally, U.S. Pat. No. 4,005,506 to Moore discloses a securing mechanism which has a strap intended to be inserted through a ring structure and doubled over. The strap is characterized by one of the VELCRO ®-type pile engagement fabrics, i.e., the hooks or the loops. The ring through which the strap is inserted has a tab which is characterized by the other VELCRO ®-type engagement fabric. As the strap is passed through the ring and doubled over, the pile and loop portions of the tab portion and the securing strap are joined locking the strap to the buckle.

Other securing straps also involve the use of a ring. In these cases, the securing strap is generally attached to an article, such as a garment, etc. Another portion of the garment contains a ring or a buckle through which the end of the securing strap is passed and pulled to tighten the garment portions. One surface of the strap is provided with the VELCRO ® loop material. The VELCRO ® hook material may be located farther down the strap so that the strap with the VELCRO ® hook portion can be pulled through the loop, doubled over and attached to the hook portion. Illustrative patents include U.S. Pat. No. 3,827,107 to Moore, U.S. Pat. No. 3,947,927 to Rosenthal and U.S. Pat. No. 3,430,299 to Copen.

None of the prior art patents, however, disclose a strap having a fastener which is constructed in a sandwich fashion such that one end of the strap has a gripping surface on both sides and the other end is bifurcated having two internal gripping surfaces which co-act with the gripping surfaces of the first end to form a strong fastener attachment.

SUMMARY OF THE INVENTION

It is therefore an object of the invention to overcome the disadvantages of the prior art securing straps and fasteners.

It is further an object of the invention to provide a securing strap which has a stronger fastener which may be easily separable by normal peeling forces, but will resist forces in a plane substantially parallel to the interfacial plane of engagement.

These and other objects of the present invention are met by the flexible securing strap of the present invention which has at one end a double-sided strip of VELCRO ® hook material. The other end is separated or bifurcated into two sections, each of which have the VELCRO ® loop material on the interior surface, such that the VELCRO ® hook end will attach to the interior surfaces of each the bifurcated end sections in a sandwich fashion.

Of particular importance is the fastener which comprises a first end having a first planer surface which has a first engaging element secured thereto and a second planer surface having the same type of first engaging element secured thereto such that the first engaging elements face in opposite directions with the first end positioned therebetween. The fastener also includes a second end adapted to interlock with the first end. The second end is bifurcated or separated into a first section and a second section. Each of these sections have substantially the same dimensions as the first end. The first section of the second end is defined by a first internal surface having a second engaging element secured thereto and the second section is defined by a second internal surface having the same type of second engaging element secured thereto. Thus, the second engaging elements of the first and second internal surfaces of the second end of the fastener are adapted to grippingly received the first engaging elements of the first and second sections of the first end of the fastener.

A particular advantage of the securing strap of the present invention is in the fastener itself. The fastener has two gripping interfaces defined by two paired reciprocal gripping surfaces, as opposed to standard VELCRO ® type fastener attachments which only have one gripping interface. Thus, it is extremely difficult to dislodge the fastener once the ends of the fastener are engaged in gripping contact. However, by simple peeling action, the gripping engagement can be disengaged at will.

A further advantage to the securing strap of the present invention is that there are no metallic or hard objects involved in the component parts of the invention, which may mark up or scratch the surface of the device being secured by the strap. Further still, the securing strap of the present invention can be easily cleaned by, for example, washing in a washing machine. Because there are no metal parts to the strap, there is also no concern over elements which may rust.

The uses for the securing strap and fastener of the present invention are numerous, including bicycle and automobile securing straps, etc.

DESCRIPTION OF THE DRAWINGS

FIG. 1 is a perspective view of the preferred embodiment of the securing strap of the present invention.

FIG. 2 is a side elevational view of the first or male end of the securing strap of FIG. 1 taken along lines II—II.

FIG. 3 is a side elevational view of the securing strap of FIG. 1 illustrating the two ends of the securing strap in fastening contact.

FIG. 4 is a perspective view of an alternative embodiment of the securing strap.

FIG. 5 a side elevational view showing the securing strap of FIG. 4 fastened to two objects.

DETAILED DESCRIPTION OF THE DRAWINGS

The securing strap of the present invention will now be described with reference to the drawings, in which the same reference numerals will be applied to the same features of the securing strap throughout the several drawings. Referring now to FIGS. 1-3 there is illustrated a securing strap 10 which has as its primary purpose the ability to secure an object of virtually any cross sectional diameter. For example, the securing strap 10 could be used as a bicycle strap, a book strap, or a tie-down securing strap for automotive vehicles.

The securing strap has three main features: a main strap 12 a first or male end 18, and a second or female end 20. The male end 18 and the female end 20 join together to form the fastener 21, which illustrated in FIG. 3.

Although the main strap 12 need not be elastic, it is preferable to have the strap portions constructed of a woven or knitted yarn which incorporates elastic filamentary yarns to provide elastic retention forces. The advantage to the elastic strap is that it provides a snugger fit which better secures the object to be held. Any strap length desired may be used. Further, although it is preferable to have a flattened strap as illustrated with a first surface 14 and a second surface 16, the strap 12 may be rounded or braided. The rounded and braided structures may also be form of elastic or resilient material.

Of particular importance to the present invention is the unique fastener construction 21. The fastener is formed by the mating of first male end 18 with second female end 20. The male end 18 is defined by first and second gripping surfaces 22, 24, which are secured to the strap 12 by sewing, gluing or other means known to the art. The gripping surfaces are preferably constructed of VELCRO ® brand separable fastener tape materials. These materials have a woven or knitted base of a synthetic heat deformable material, such as nylon, and have resilient engaging elements upstanding from the respective base member. In the preferred embodiment, the engaging elements of male end 18 are constructed in the form of hook-like elements which mate with loop-like hooking elements on the opposed engaging surface portions in the female end 20. However, it should be understood that any flexible engaging elements, including mushroom-like elements, resilient projections, etc., which are readily securable in face-to-face relation and which particularly resist the forces parallel to the interfacial plane of engagement, are contemplated within the scope of the present invention. Examples of mushroom configured hooking elements are disclosed in U.S. Pat. Nos. 3,138,841 and 3,320,649 to Naimer and U.S. Pat. Nos. 3,718,725 and 3,770,359 to Hamano. Further examples of knitted form fastener members within the scope of the present invention are disclosed in U.S. Pat. Nos. 3,530,687 and 3,539,436 to Hamano.

The second or female end 20 is defined by a bifurcation in the flexible strap 12 in order to form two jaw-like sections 15 and 17. Generally, one section is the normal extension of main flexible strap 12. The other section is attached at location 19 by sewing or other means known to the art. The bifurcated sections 15, 17 are defined by a first receiving surface 26 on section 15 and a second receiving surface 28 on section 17. As described above, these surfaces include the reciprocal mating elements to the gripping surfaces 22, 24 on the first end 18. As with the first end 18, the first and second receiving surfaces 26, 28 may be secured to their respective bifurcated sections 15, 17 by sewing, gluing or other means known to the art.

In operation, the securing strap 10 is placed in encircling relation about a device to be secured. If necessary, the securing strap may be overlapped several times. As mentioned above, the device to be secured may have any cross-sectional shape which can be suitably encircled by the flexible strap 10.

The ends 18, 20 of the fastener 21 are connected by placing the male end 18 within the jaws of the bifurcated sections 15, 17. By pressing the outer surfaces of the sections 15, 17 of female end 20 together, the first and second gripping surfaces 22, 24 of the male end 18 come into gripping attachment with the first and second receiving surfaces 26, 28 of the female end 20 forming fastener 21 as illustrated in FIG. 3. Thus, the fastener has four gripping surfaces which, when fully engaged, create a stronger gripping power which is very difficult to pull apart. The fastener 21 is greatly improved in strength over those of the prior art because the male end 18 is fastened on both sides creating two interfacial gripping surfaces. The sheer tension on the strap is therefore equalized.

It is to be understood that the interlocking pile elements of the fastener might well be reversed, i.e., the loop elements on the first and second receiving surfaces 26, 28 may be replaced with the hook elements, which are on the first and second gripping surfaces 22, 24 of the male end 18, and vice-versa. It may also be desirable to have the hook elements on one surface of the male end 18 and have the loop elements on the other surface. The female end 20 would then be altered to have the reciprocating mating elements on its receiving surfaces 26, 28.

Once the gripping and receiving surfaces are fully engaged, they can be separated by peeling forces normal to the interfacial planes of engagement; however, they will resist forces in a plane substantially parallel to the interfacial planes of engagement. Therefore, it would be very difficult to dislodge the fastener 21 except by the normal action of peeling the sections 15, 17 of the second end 20 from the male end 18.

In addition to the embodiments and applications illustrated, the fastener and securing strap may be utilized in numerous other applications. For example, reference is made to FIGS. 4 and 5 which illustrate an alternative embodiment to the securing strap of FIG. 1. The securing strap of this embodiment is defined by two ends 50, 52 each end having its own male end 18 and female end 20. The male end 18 is connected to a secondary strap 54 which in turn is connected to securing strap 12 at locations 56. All of straps 12 and 54 may be resilient as previously described.

In operation, the male ends 18 are designed to co-act with their adjacent female ends 20 which form a loop defined by location 58 as best illustrated in FIG. 5. The loop 58 may encircle a post or other object, illustrated at 60. In this manner, separated objects 60 may be secured by the securing strap of FIG. 4. The securing strap of FIG. 4 is contemplated for use as a tie-down mechanism for automobile and motorcycle racks.

Although the invention has been illustrated and described in two forms, it is to be understood that these forms are presented by way of example only and should not be limited. The invention comprises all of the embodiments and modifications within the spirit and scope of the following claims.

I claim:

1. A flexible strap fastener including an elongated flexible resilient strap, comprising:
   (a) a first end having a first planer surface, which includes a first peelable hook-and-loop type engaging element secured thereto and a second planer surface which includes the first peelable hook-and-loop type engaging element secured thereto such that the first engaging elements face in opposite directions;
   (b) a second end having corresponding peelable, flexible hook-and-loop type engaging elements adapted to interlock with the first end, the second end being bifurcated into a first section and a second section, wherein the first section and the second section are joined at only one end, each section having substantially the same dimensions as the first end, wherein the first section is defined by a first internal surface having the second engaging element secured thereto and the second section is defined by a second internal surface having a second engaging element secured thereto such that the second engaging elements of the first and second internal surfaces of the second end grippingly receive the first engaging elements of the first and second sections of the first end when the first and second elements are applied in a closed position, each section of the second end further comprising a flexible resilient material enabling the second end to be peeled away from the first end.

2. The fastener according to claim 1 wherein the first engaging element comprises a pile fabric with hook elements and the second engaging element comprises a pile fabric with loop elements.

3. The fastener according to claim 2 wherein the first engaging element comprises a pile fabric with loop elements and the second engaging element comprises a pile fabric with hook elements.

4. A securing strap comprising:
   an elongated strap of flexible resilient material having a first end and a second end;
   wherein the first end has a tip portion, a first planer surface and a second planer surface such that the first planer surface and the second planer surface face in opposite directions, wherein the first end includes a continuous flexible hook-and-loop type engaging element extending from the first planer surface over the tip portion to the second planer surface, and the second end having corresponding flexible hook-and-loop type engaging elements is bifurcated into a first section and a second section, wherein the first section is an extension of the securing strap and the second section is attached to the securing strap such that the first section and the second section are joined at only one end, each of the first and second sections having substantially the same dimensions as the first end, wherein the first section is defined by a first internal surface having a second engaging element secured thereto and the second section is defined by a second internal surface having the second engaging element secured thereto, such that the second engaging elements of the first and second internal surfaces of the second end grippingly receive the first engaging elements of the first and second sections of the first end when the first and second elements are applied in a closed position, each section of the second end further comprising a flexible resilient material to enable the second end to be peeled away from the first end.

5. The securing strap according to claim 4 wherein the strap is made of flexible material.

6. The securing strap according to claim 4 wherein the first engaging element comprises a pile fabric with hook elements and the second engaging element comprises a pile fabric with loop elements.

7. The securing strap according to claim 4 wherein the first engaging element comprises a pile fabric with loop elements and the second engaging element comprises a pile fabric with hook elements.

8. A securing strap comprising:
   an elongated strap of flexible, resilient material having a first end and a second end, wherein each of the first and second ends include a fastener, the fastener comprising:
   a male end having a first planer surface, which includes a first peelable hook-and-loop type engaging element secured thereto and a second planer surface, which includes the first engaging elements secured thereto such that the first engaging elements face in opposite directions; and a female end having corresponding peelable, flexible hook-and-loop type engaging elements adapted to interlock with the male end, the female end being bifurcated into a first section and a second section, wherein the first section and the second section are joined at only one end, each section having substantially the same dimensions as the first end, wherein the first section is defined by a first internal surface having the second engaging element secured thereto and the second section is defined by a second internal surface having a second engaging element secured thereto such that the second engaging elements of the first and second internal surfaces of the female end grippingly receive the first engaging elements of the first and second sections of the first end when the first and second elements are applied in a closed position, wherein each section of the female end further comprises a flexible resilient material enabling the female end to be peeled away from the male end.

* * * * *